United States Patent
Gacoin et al.

(10) Patent No.: US 12,416,819 B2
(45) Date of Patent: Sep. 16, 2025

(54) OPTICAL LENS

(71) Applicant: ESSILOR INTERNATIONAL, Charenton-le-Pont (FR)

(72) Inventors: Eric Gacoin, Charenton-le-Pont (FR); Khamphone Sisavanh, Charenton-le-Pont (FR); Jean Stephane, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 461 days.

(21) Appl. No.: 17/920,320

(22) PCT Filed: Apr. 21, 2021

(86) PCT No.: PCT/EP2021/060375
§ 371 (c)(1),
(2) Date: Oct. 20, 2022

(87) PCT Pub. No.: WO2021/214133
PCT Pub. Date: Oct. 28, 2021

(65) Prior Publication Data
US 2023/0176400 A1    Jun. 8, 2023

(30) Foreign Application Priority Data
Apr. 21, 2020   (EP) .................... 20315202

(51) Int. Cl.
*G02C 7/02*     (2006.01)
*B24B 13/06*    (2006.01)
*B29D 11/00*    (2006.01)

(52) U.S. Cl.
CPC ............. *G02C 7/028* (2013.01); *B24B 13/06* (2013.01); *B29D 11/00971* (2013.01); *B29D 11/0098* (2013.01); *G02C 7/022* (2013.01); *G02C 2202/24* (2013.01)

(58) Field of Classification Search
CPC .... G02C 7/028; G02C 7/022; G02C 2202/24; B24B 13/06; B24B 13/0012; B29D 11/00971; B29D 11/0098; B29D 11/00009; G02B 3/0025; G02B 3/0031; G02B 3/0056; G02B 3/08
USPC .................................... 351/159.77
See application file for complete search history.

(56) References Cited

U.S. PATENT DOCUMENTS

| | | | |
|---|---|---|---|
| 10,268,050 B2 * | 4/2019 | To ............ | G02C 7/022 |
| 11,719,956 B2 * | 8/2023 | Marshall ........ | G02C 7/06 351/159.48 |
| 11,782,293 B2 * | 10/2023 | Varnas .......... | G02C 7/022 351/159.42 |
| 2013/0236262 A1 | 9/2013 | Hon | |

(Continued)

OTHER PUBLICATIONS

International Search Report for PCT/EP2021/060375 dated Aug. 4, 2021, 4 pages.

(Continued)

*Primary Examiner* — William R Alexander
(74) *Attorney, Agent, or Firm* — NIXON & VANDERHYE (57) ABSTRACT

Disclosed is a method implemented by a computer for determining surfacing data to obtain a surface of a lens element, the surface of the lens element including: a refraction area having a first curvature; and multiple optical elements placed on at least part of the finished optical surface, each optical element having at least a second curvature.

19 Claims, 5 Drawing Sheets

(56) References Cited

U.S. PATENT DOCUMENTS

| | | |
|---|---|---|
| 2017/0131567 A1 | 5/2017 | To et al. |
| 2017/0285620 A1 | 10/2017 | Meynen et al. |
| 2018/0290257 A1 | 10/2018 | Piraube et al. |
| 2018/0364498 A1* | 12/2018 | Piraube .................. G16H 10/40 |
| 2019/0212580 A1 | 7/2019 | To et al. |
| 2020/0012123 A1* | 1/2020 | Newman ................ G02C 7/049 |
| 2021/0389608 A1* | 12/2021 | Marshall .................. G02C 7/06 |
| 2023/0161177 A1* | 5/2023 | Varnas ............. B29D 11/00028 |
| | | 351/159.42 |

OTHER PUBLICATIONS

Written Opinion of the ISA for PCT/EP2021/060375 dated Aug. 4, 2021, 6 pages.

\* cited by examiner

OPTICAL LENS

CROSS-REFERENCE TO RELATED APPLICATIONS

This application is the U.S. national phase of International Application No. PCT/EP2021/060375 filed Apr. 21, 2021 which designated the U.S. and claims priority to EP Patent Application No. 20315202.0 filed Apr. 21, 2020, the entire contents of each of which are hereby incorporated by reference.

BACKGROUND OF THE INVENTION

Field of the Invention

The disclosure relates to a method implemented by computer means for determining surfacing data to obtain a surface of a lens element. The disclosure also relates to a method implemented by computer means for determining transfer laws with a selected manufacturing method.

Additionally, the disclosure relates to a computer program product comprising a series of instructions, which, when loaded in a computer, results in the execution by said computer of the steps of a method for determining surfacing data to obtain a lens element Additionally, the disclosure relates to a lens element obtained using a method according to the disclosure.

Furthermore, the disclosure relates to a method implemented by computer means for determining a mold for a lens element.

Description of the Related Art

It is known to provide optical lens element with at least one complex surface, such as a surface bearing a plurality of optical elements.

This optical lens element may be manufactured by molding or by digital surfacing.

Optical lens element manufactured by digital surfacing, may be polished or coated after being surfaced and this set is defined by a selected manufacturing method. The selected manufacturing method depends on the desired design of the complex surface of the lens element.

The mold used for manufacturing optical lenses by molding, may be made by digital surfacing and may be polished after being surfaced.

Optical lenses usually may, after manufacture, exhibit defects of form, in particular mean sphere and/or cylinder defect and/or a polishing ring defect. Such a defect may be due to a step of surfacing, polishing or coating the surface of the lens or of the mold of the lens used to manufacture the lens, for example, the polishing not uniformly removing the material from the surface to be polished thus deforming said surface. Therefore there is a need to provide a method to compensate and correct the defects of the lens element properties induced by a selected manufacturing method and thus a method that makes it possible to enhance the complex surface production precision of a lens element which is simple to implement, suited to all types of progressive surfaces and that ensures a good efficiency.

SUMMARY OF THE DISCLOSURE

To this end, the disclosure proposes a method implemented by computer means for determining surfacing data to obtain a surface of a lens element, the surface of the lens element comprising a refraction area having a first curvature and
a plurality of optical elements placed on at least part of the finished optical surface, each optical element having at least a second curvature
wherein the method comprises:
providing lens data, the lens data indicating at least a shape of said surface of the lens element to obtain,
said surface of the lens element comprising a surface of the refraction area and a surface of the optical elements placed on the refraction area,
the at least a shape of said surface of the lens elements being associated with a targeted optical function;
selecting a manufacturing method intended to be implemented to obtain said surface of the lens element, in which said manufacturing method comprises surfacing and introduces surface defects on said surface of the lens element, the surface defects modificating the targeted optical function;
providing a surfacing transfer law associated with the selected manufacturing method,
the transfer law corresponding to transformations to apply to the shape of the surface of the lens element for compensating the surface defects introduced by the selected manufacturing method such that the targeted optical function is obtained by the selected manufacturing method; and
determining the surfacing data to obtain the surface of the lens element associated with the targeted optical function, the determining the surfacing data being based on the lens data and the transfer law.

Advantageously, determining surfacing data based on the lens data and the transfer law allows tuning the design of the uncovered lens element in order to obtain an accurate treated lens element having a targeted optical function, for example adapted for a wearer once the selected manufacturing method is done.

By "targeted optical function", we mean a targeted surfacic optical function.

The disclosure further relates to a method for manufacturing a lens element comprising
determining surfacing data to obtain a lens element with the method implemented by computer means; and
manufacturing the lens element by using the determined surfacing data with the selected manufacturing method.

The disclosure further relates to a method for determining a transfer law associated with a selected manufacturing method of a lens element, the lens element comprising:
a refraction area having a first curvature and
a plurality of optical elements placed on at least part of the finished optical surface, each optical element having at least a second curvature;
wherein the method comprising:
providing lens data, the lens data indicating at least a shape of said surface of the lens element to obtain,
said surface of the lens element comprising a surface of the refraction area and a surface of the optical elements placed on the refraction area,
the shape of said surface of the lens elements being associated with a targeted optical function;
selecting a manufacturing method intended to be implemented to obtain a surface of the lens element, in which said manufacturing method comprises surfacing and introduces surface defects on the surface of the lens element
selecting a predictive model of said surface defects;
determining, by means of said predictive model, a surface defect data which would be introduced by the selected manufacturing method;

from the surface defect data and the lens data, determining a transfer law corresponding to transformations to apply to the shape of the surface of the lens element for compensating the surface defects introduced by the selected manufacturing method such that the targeted optical function is obtained by the selected manufacturing method.

Alternatively or in combination with the precedent method for determining a transfer law, the method for determining a transfer law associated with a selected manufacturing method of a lens element comprises:
  providing a lens element which has been manufactured with the selected manufacturing method, the lens element comprising:
    a refraction area having a first curvature and
    a plurality of optical elements placed on at least part of the finished optical surface, each optical element having at least a second curvature;
  providing lens data, the lens data indicating at least a shape of said surface of the lens element to obtain,
said surface of the lens element comprising a surface of the refraction area and a surface of the optical elements placed on the refraction area,
the at least a shape of said surface of the lens elements being associated with a targeted optical function;
  measuring at least one optical characteristic of at least a zone of the lens element;
  determining at least one optical characteristic error based on a comparison of the measured at least one optical characteristic and the targeted optical function;
  compiling information corresponding to the determined optical characteristic error into database as correction information;
  determining a transfer law associated with the selected manufacturing method used to manufacture the lens element based on the correction information of the database, the transfer law correcting an original shape of the surface of the lens element comprising the at least one optical element so that once manufactured by the selected manufacturing method, the lens element reaches the targeted optical function.

Another aspect of the disclosure relates to a computer program product comprising a series of instructions, which, when loaded in a computer, results in the execution by said computer of the steps of a method for determining surfacing data to obtain a lens element. The lens element comprising:
  a refraction area having a first curvature and
  a plurality of optical elements placed on at least part of the finished optical surface, each optical element having at least a second curvature; and wherein the method comprises:
  providing lens data, the lens data indicating at least a shape of said surface of the lens element to obtain,
said surface of the lens element comprising a surface of the refraction area and a surface of the optical elements placed on the refraction area,
the shape of said surface of the lens elements being associated with a targeted optical function;
  selecting a manufacturing method intended to be implemented to obtain said surface of the lens element, in which said manufacturing method introduces surface defects on said surface of the lens element, the surface defects modificating the targeted optical function;
  providing a surfacing transfer law associated with the selected manufacturing method,
the transfer law corresponding to transformations to apply to the shape of the surface of the lens element for compensating the surface defects introduced by the selected manufacturing method such that the targeted optical function is obtained by the selected manufacturing method; and
  determining the surfacing data to obtain the surface of the lens element associated with the targeted optical function, the determining the surfacing data being based on the lens data and the transfer law.

According to further embodiments which can be considered alone or in combination, the selected manufacturing method comprises a polishing process, the polishing process introducing polishing surface defects. The providing a transfer law comprises providing a polishing transfer law associated with the polishing process. The polishing transfer law corresponds to transformations to apply to the shape of the surface of the lens element for compensating the polishing surface defects introduced by the polishing process such that the targeted optical function is obtained by the selected manufacturing method. The determining the surfacing data to obtain the surface of the lens element associated with the targeted optical function, is based on the lens data and at least the polishing transfer law.

The polishing transfer law may depend on the shape of the holder and/or of the optical elements and/or the material of the lens element and/or polishing condition. The polishing condition may be for example the tool for polishing, the machine, the slurry, the parameters for polishing or the cinematic of the polishing process.

According to further embodiments that can be considered alone or in combination, the selected manufacturing method comprises a coating process, the coating process introducing coating surface defects. The providing a transfer law comprises providing a coating transfer law associated with the coating process. The coating transfer law corresponds to transformations to apply to the shape of the surface of the lens element for compensating the coating surface defects introduced by the coating process such that the targeted optical function is obtained by the selected manufacturing method. The determining the surfacing data to obtain the surface of the lens element associated with the targeted optical function, is based on the lens data and at least the coating transfer law.

According to further embodiments the present disclosure is related to a method implemented by computer means for determining surfacing data to obtain a surface of a mold of a lens element, the lens element comprising:
  a refraction area having a first curvature and
  a plurality of optical elements placed on at least part of the finished optical surface, each optical element having at least a second curvature; and
wherein the method comprises:
  providing lens data, the lens data indicating at least a shape of said surface of the mold of the lens element to obtain,
the surface of the lens element comprising a surface of the refraction area and a surface of the optical elements placed on the refraction area,
the at least a shape of the surface of the lens elements being associated with a targeted optical function;
  selecting a manufacturing method intended to be implemented to obtain said surface of a mold of the lens element, in which said manufacturing method introduces surface defects on said surface of the mold of the lens element, the surface defects modificating the targeted optical function;
  providing a surfacing transfer law associated with the selected manufacturing method, the transfer law corresponding to transformations to apply to the shape of the mold of the surface of the lens element for compensating the surface defects introduced by the selected manufacturing method such that the targeted optical function is obtained by the selected manufacturing method; and determining the surfacing data to obtain the surface of the mold of the lens element associated with the targeted optical function, the determining the surfacing data being based on the lens data and the transfer law.

According to further embodiments which can be considered alone or in combination, the transformations are related to one or several elements from the list below:

local power of the lens element;

optical function associated to the refractive area and/or the optical elements asphericity of the refractive area and/or the optical elements;

mean power of the lens element;

surface of the refractive area and/or the optical elements; and transition zone between the optical elements and the refractive area.

According to further embodiments which can be considered alone or in combination, the targeted optical function is adapted to at least one of slow down, retard or prevent a progress of the eye of the person, or to correct an abnormal refraction of the eye of the person for at least one distance of view, or to identify an lens element.

Another aspect of the disclosure relates to a lens element intended to correct an abnormal refraction of an eye of a person comprising:

a refractive area having a first surfacic optical power, and a plurality of optical elements placed on at least one surface of the holder, the plurality of optical elements having a second surfacic optical power and each optical element having a maximum sag, wherein, the holder and the plurality of optical elements being intended to be polished, the maximum sag of the plurality of optical elements is at least 10% higher than the maximum sag of the plurality of optical elements after polishing, preferably at least 20% higher than the maximum sag of the plurality of optical elements after polishing.

According to another embodiment, the sag of each optical element may be at least 10% higher than the sag of each polished optical element.

According to further embodiments which can be considered alone or in combination:

the specific wearing condition corresponds to the standard wearing condition; and/or the abnormal refraction of the eye is myopia; and/or at least a part of the plurality of optical elements are placed on at least a ring on the at least one surface of the refraction area; and/or the plurality of optical elements are placed on concentric rings on the at least one surface of the refraction area; and/or the mean sphere of all the coated optical elements placed on a concentric ring is identical; and/or the mean sphere of at least part of the polished optical elements varies from the center to the edge of the lens element; and/or the mean sphere of at least part of the polished optical elements decreases from the center to the edge of the lens element; and/or the mean sphere of at least part of the polished optical elements increases from the center to the edge of the lens element; and/or at least part of the optical elements are contiguous; and/or the optical elements may be concave or convex.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DESCRIPTION OF THE PREFERRED EMBODIMENTS

The disclosure relates to a method for determining a lens element, for example adapted for a wearer.

In the context of the present disclosure, the term "lens element" can refer to lens blank having a finished face and an unfinished face where the unfinished is intended to be surfaced to provide an uncut optical lens, an uncut optical lens or a spectacle optical lens edged to fit a specific spectacle frame or an ophthalmic lens or finished lens or a semi-finished.

The lens element according to the present disclosure or the mold of the lens element to manufacture the lens element according to the present disclosure, is manufactured by digital surfacing by using surfacing data.

All the embodiments described below may be related to the manufacturing of a lens element or a mold of a lens element to manufacture.

The lens element according to an embodiment of the present disclosure is described as being adapted for a person and intended to be worn in front of an eye of said person to prevent or at least slow down a progression of abnormal refractions of the eye such as myopia or hyperopia. However, it will appear clearly to the person skilled in the art that the lens element may have any optical function, for example an optical function not adapted to the wearer.

Figure 8:
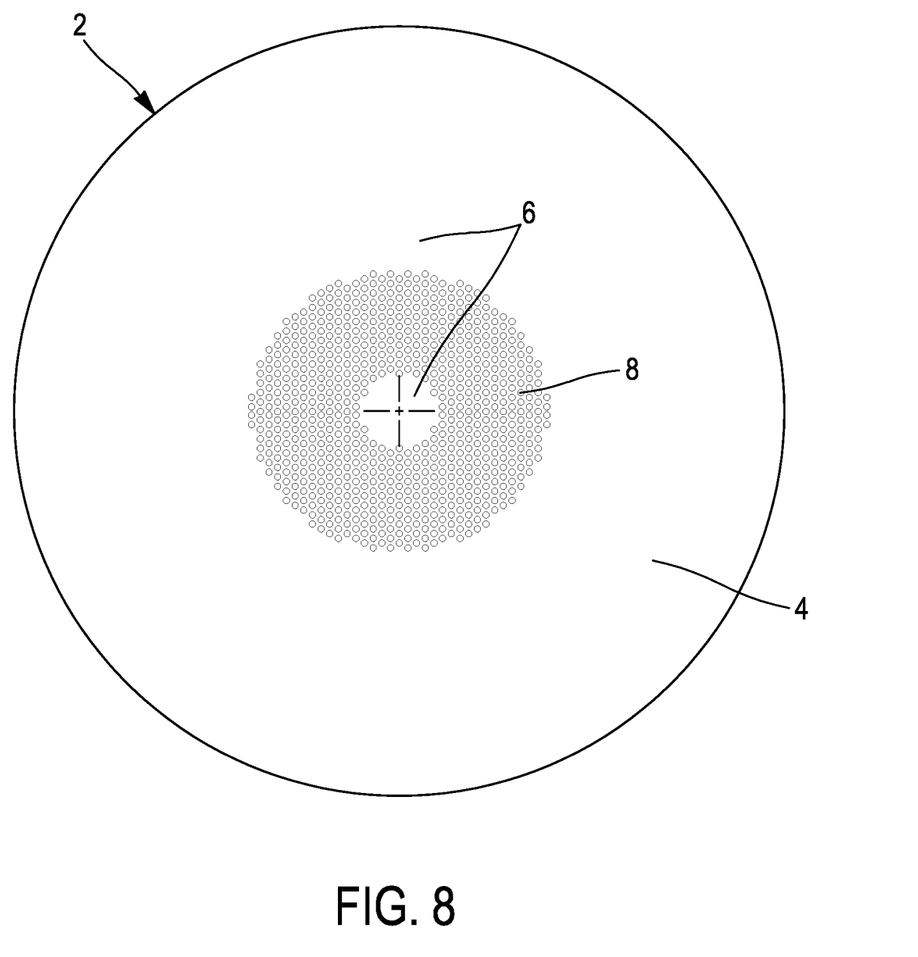
FIG. 8 illustrates a plan view of a lens element according to an embodiment of the present disclosure.

For example, as illustrated on FIG. 8, the lens element 2 may have a surface 4, in other words a a finished optical surface 4, comprising:
- a refraction area 6 having a first curvature and
- a plurality of optical elements 8 placed on at least part of the finished optical surface, each optical element having at least a second curvature.

The finished optical surface may correspond to a surface of a lens element to be adapted for a person and intended to be worn in front of an eye of said person to prevent or at least slow down a progression of abnormal refractions of the eye such as myopia or hyperopia. However, it appears clearly to the person skilled in the art that the lens element may have any optical function, for example an optical function not adapted to the person.

The first curvature of the refraction area 6 may correspond to a first refractive power, for example based on the prescription of the eye of the person. The prescription is adapted for correcting the abnormal refraction of the eye of the person.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

For example, the shape of a refraction area 6 is spherical. The shape of the opposite surface may be configured so that the refraction area has an optical function of focusing an image on the retina.

For example, the shape of said second face is spherotorical. Advantageously, the shape of said second face is aspherical and calculated by an optical optimization such that every light beam incident on the refraction area 6 is focused on the retina of the wearer when the lens is worn.

The refraction area 6 is preferably formed by the area not covered by any optical element of the plurality of optical elements 8. In other words, the refractive area is the complementary area to the areas formed by the plurality of optical elements 8.

According to different embodiments of the disclosure, the abnormal refraction of the eye is myopia, hyperopia or astigmatism.

As illustrated on FIG. 9, the finished surface 4 may comprise a plurality of optical elements 8.

In the sense of the disclosure, the term "plurality of" is to be understood as "at least three".

At least one optical element of the plurality of optical elements 8 has a second curvature.

The second curvature may be different from the first curvature.

Typically, the second curvature may be configured so that in combination with the opposite surface of a final optical lens, the plurality of optical elements 8 has an optical function of focusing an image in front of and/or behind the retina of the person using such optical lens.

In the sense of the disclosure "focusing" is to be understood as producing a focusing spot with a circular section that can be reduced to a point in the focal plane.

Advantageously, such optical function of the optical elements produces an optical signal that inhibits the deformation of the retina of the eye of the wearer, allowing to prevent or at least slow down the progression of the abnormal refraction of the eye of the person wearing the lens element 2.

When the abnormal refraction of the eye of the person corresponds to myopia the optical elements 8 have an optical function of focusing an image in front of the retina of the eye of the wearer when worn by the wearer.

When the abnormal refraction of the eye of the person corresponds to hypermetropia the optical elements 8 have an optical function of focusing an image behind the retina of the eye of the wearer when worn by the wearer.

The second curvature may be the same as the first curvature.

According to an embodiment of the disclosure, at least part, for example all of the optical elements are arranged to provide a diffractive optical function on the final optical lens.

Preferably, at least 30%, for example at least 80%, for example all, of the optical elements have an optical function of focusing an image on a position other than the retina.

The first surfacic curvature of at least one of the plurality of the optical element 8 may be a spherical and/or aspherical and/or cylindrical and/or toric surfacic curvature and/or progressive and/or tilted.

The second surfacic curvature of at least one of the plurality of the optical element 8 may be a spherical and/or aspherical and/or cylindrical and/or toric surfacic curvature and/or progressive and/or tilted.

Figure 1:
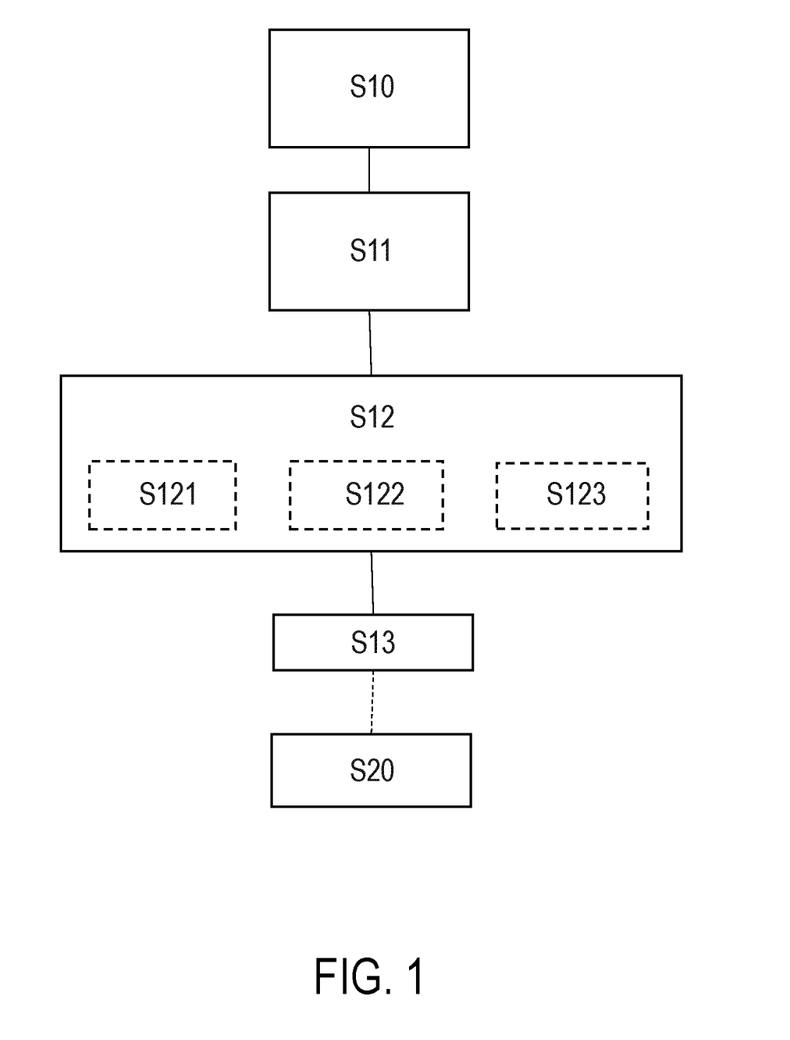
FIG. 1 illustrates a chart-flow embodiment of the method for determining surfacing data according to an embodiment of the present disclosure and of the method for manufacturing a lens element according to an embodiment of the present disclosure.

As illustrated on FIG. 1, a method implemented by computer means for determining surfacing data to obtain a surface of a lens element according to the present disclosure comprises at least:
- a providing step S10 to provide a lens data,
- a selecting step S11 to select a manufacturing method,
- a providing step S12 to provide a surfacing transfer law associated with the selected manufacturing method, and
- a determining step S13.

A lens data indicating at least a shape of the surface of the lens element is provided during the providing step S10.

The shape of the surface of the lens element corresponds to a shape of the surface of the refraction area and to at least a shape of the surface of the optical elements of the lens element to be determined. The shape of the surface of the refraction area and/or the shape of the surface of the optical elements may be associated with the prescription for correcting the abnormal refraction of the eye of the person. The shape of the surface of the lens element may be associated with a targeted optical function of said lens elements.

The method for determining surfacing data according to the disclosure further comprises a step S11 of selecting a manufacturing method intended to be implemented to obtain said surface of the lens element.

The manufacturing method comprises a surfacing process. The manufacturing method may also comprise a polishing process and/or a coating process. The step of selecting a manufacturing method may also comprise the choice of a manufacturing method, including the choice of the equipment, of the toolage, of the procedure, etc. The person skilled in the art will be able to choose a manufacturing method, notably on the basis of the characteristics of the lens element to be produced (geometry, material).

For example, the conditions of the surfacing process may relate to the surfacing tool, the surfacing machine, the slurry, the surfacing parameters such as speed, cinematic, force, timing, cycling, the shape of the surface of the refractive area and/or of the optical elements and/or the material of the lens element and/or the targeted optical function.

For example, the conditions of the polishing process may relate to the polishing tool, the polishing machine, the slurry, the polishing parameters such as speed, cinematic, force, timing, cycling, polishing liquid, the shape of the surface of the refractive area and/or of the optical elements and/or the material of the lens element and/or the targeted optical function.

For example, the conditions of the coating process may relate to the withdrawal speed for a dip-coating type process or the rotation speed for spin-coating. The conditions of application may also relate to drying parameters and/or the targeted optical function.

The manufacturing method may introduce surface defects on said surface of the lens element, the surface defects modificating the targeted optical function. Typically, the surface defect may be introduced by a surfacing process, a polishing process, a coating process or by a combination of a surfacing, a polishing and/or a coating process.

The surface defects may be reproducible surface defect or non reproducible defect, preferably reproducible surface defect.

Within the meaning of the present disclosure, a surface defect introduced by a manufacturing method is said to be reproducible if it is introduced in a robust and repeatable manner by the manufacturing method or by a surfacing and/or polishing and/or coating process.

A surface defect [respectively surfacing defect, polishing defect or coating defect] is considered to be reproducible if, for a given manufacturing method, the independent production in N copies of one and the same given progressive surface generates a defect, said defect being identical qualitatively (nature of the defect and, where appropriate, its location on the progressive surface) and quantitatively for the N copies. A defect is considered to be identical quantitatively if the dispersion of the value of the defect over the N copies is less than or equal to the tolerance set for the quantity considered, the dispersion corresponding to the difference between the maximum value and the minimum value of the quantity over the N copies.

Preferentially, N takes a value greater than 15.

A surface defect [respectively a mean sphere defect; respectively a cylinder defect; respectively a polishing ring defect] associated with a given manufacturing method is considered to be reproducible if the independent production in N copies of one and the same given surface of the lens element by said manufacturing method generates a surface defect [ respectively a mean sphere defect; respectively a cylinder defect; respectively a polishing ring defect], the value of the surface defect [respectively of the surface defect between two reference points on the surface of the lens element; respectively of the mean sphere defect; respectively of the cylinder defect; respectively of the polishing ring defect](deviation relative to the nominal value) being identical subject to a variation of +/−0.5 diopter, preferably +/−0.25 diopter and or to a variation of 0.5 μm, preferably of 0.1 μm. N is as defined above.

The method for determining surfacing data according to the disclosure further comprises a step S12 of providing a transfer law associated with the selected manufacturing method.

Advantageously, the transfer law may be determined by a method according to another aspect of the disclosure.

The transfer law corresponds to transformations to apply to the shape of the surface of the lens element for compensating the surface defects introduced by the selected manufacturing method such that the targeted optical function is obtained by the selected manufacturing method. Thus, the shape of the surface of the lens element associated with the targeted optical function, is obtained by the selected manufacturing method.

The most adapted transfer law corresponds to the transfer law for which the modifications of the lens element characteristics induced by the selected manufacturing method are best compensated. By compensating the surface defects, we mean that the targeted optical function is obtained with a tolerance plus or minus 10% or 20%.

The compensation may occur at different level:
height of the optical elements
mean power of the optical elements
optical function of the optical elements
transition zone between the optical elements and the refractive area
refractive area shape (flat, spherical, progressiv–addition value– . . . , convexity, diameter)+the substrate (PC, CR39, HI . . . )
And thus, differently over the surface
The transformations may be related to one or several elements from the list below (but not limited to):
local power of the lens element;
optical function associated to the refractive area and/or the optical elements
asphericity of the refractive area and/or the optical elements;
mean power of the lens element;
surface of the refractive area (shape (flat, spherical, progressiv–addition value– . . . , convexity, diameter)+the substrate (PC, CR39, HI . . . )) and/or the optical elements; and
transition zone between the optical elements and the refractive area.

According to the selected manufacturing method, the providing transfer law may comprise providing a surfacing transfer law S121 and/or a polishing transfer law S122 or/and a coating transfer law S123, corresponding to transformations to apply to the shape of the surface of the lens element for compensating respectively the surfacing surface defects and/or the polishing surface defects and/or the coating surface defects introduced by the selected manufacturing method such that the targeted optical function is obtained by the selected manufacturing method.

The method for determining surfacing data according to the disclosure further comprises a step S13 of determining the surfacing data to obtain the surface of the lens element associated with the targeted optical function based on the lens data and the transfer law.

According to further embodiments which can be considered alone or in combination, determining the surfacing data may be on the lens data and at least the surfacing transfer law and/or the polishing transfer law and/or the coating transfer law.

Advantageously, determining the lens element based on the lens data and the transfer law allows tuning the design of the lens element in order to obtain an accurate treated lens element, for example adapted for a wearer, once the lens element is manufactured.

According to further embodiments which can be considered alone or in combination, the targeted optical function is adapted to
at least one of slow down, retard or prevent a progress of the eye of the person, or
to correct an abnormal refraction of the eye of the person for at least one distance of view, or
to identify an lens element.

According to an aspect of the disclosure, the disclosure proposes a method for manufacturing a lens element comprising
- determining surfacing data to obtain a lens element with the method implemented by computer means according to one of the embodiments of the present disclosure; and
- manufacturing S20 the lens element by using the determined surfacing data with the selected manufacturing method.

As described before the selected manufacturing method comprise a surfacing process and may comprise a polishing process and/or a coating process.

Another aspect of the disclosure relates to a method implemented by computer means for determining a transfer law associated with a selected manufacturing method of a lens element.

Figure 2:
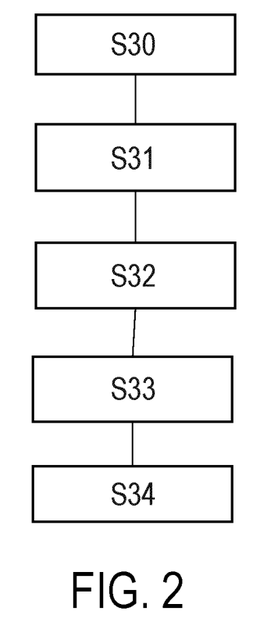
FIGS. 2 and 3 illustrates two chart-flow embodiments of the method for determining a transfer law according to respectively two embodiments of the present disclosure

As represented on FIG. 2, the method implemented by computer means for determining a transfer law associated with a selected manufacturing method comprises at least:
- a providing step S30 to provide a lens data,
- a selecting step S31 to select a manufacturing method,
- a selecting step S32 to select a predictive model of the surface defects introduced by the selected manufacturing method,
- a determining step S33 to determine a surface defect data from the predictive model, and
- a determining step S34 to determine a transfer law from the lens data and the surface defect data.

A lens data indicating at least a shape of the surface of the lens element is provided during the providing step S30.

The shape of the surface of the lens element corresponds to a shape of the surface of the refraction area and to at least a shape of the surface of the optical elements of the lens element to be determined. The shape of the surface of the refraction area and/or the shape of the surface of the optical elements may be associated with the prescription for correcting the abnormal refraction of the eye of the person. The shape of the surface of the lens element may be associated with a targeted optical function of said lens elements.

The method for determining a transfer law according to the disclosure further comprises a step S31 of selecting a manufacturing method intended to be implemented to obtain said surface of the lens element. The manufacturing method comprises surfacing and introduces surface defects on the surface of the lens element The providing step S30 and selecting step S31 may be the same as respectively the providing step S10 and selecting step S11 described above related to the method for determining surface data according to the present disclosure.

As explained before, the surface defects may be reproducible surface defect or non reproducible defect, preferably reproducible surface defect.

The reproducible nature of the defect makes it possible to use a predictive model, before any production of the surface, in order to anticipate and compensate for the defect associated with the manufacturing method.

The method for determining a transfer law according to the disclosure further comprises a step S32 of selecting a predictive model of said surface defects.

In the case where the manufacturing method introduces a plurality of reproducible surface defects, the method according to the disclosure may comprise the choice of a plurality of predictive models, i.e. one model per defect. Alternatively, the method according to the disclosure may comprise one predictive model, i.e. one model for all kind of defects. For example, one model may make it possible to predict the error of mean sphere and of asphericity, as a function of the position of the optical elements. The predictive model may have been previously established by means of a method comprising:
- a measurement step during which each the lens element manufactured by a selected manufacturing method is measured and at least one surface defect relative to the desired surfaces is quantified, the surface defect corresponding to the difference between the value of a characteristic measured on the manufactured surface and the desired value for this characteristic,
- an identification step during which measured or calculated characteristics of the surface of the lens element having an influence on the surface defect are identified,
- a determination step during which a predictive model for said manufacturing method linking the identified characteristics and the at least one defect introduced by the manufacturing method is determined.

For example, the predictive model may be a function of mean power of the optical elements and/or a function of the position of the optical elements and/or a function of the asphericity and/or a function of the characteristics of the lens element.

Advantageously, the method according to the disclosure implements a predictive model of a reproducible surface defect. The predictive model of the reproducible surface defect may be previously established, i.e. established before the actual production of the lens element to be manufactured.

Advantageously, the method according to the disclosure makes it possible to enhance the lens element surface production precision without in any way requiring the prior production of a surface affected by an error.

The surface defect may be a sphere and/or cylinder defect and/or a polishing defect and/or a coating defect as described above.

The method for determining a transfer law according to the disclosure further comprises a step S33 of determining, by means of said predictive model, a surface defect data associated to the surface defects introduced by the selected manufacturing method.

The method for determining a transfer law according to the disclosure further comprises a step S34 of determining a transfer law. Thus from the surface defect data and the lens data, a transfer law is determined. The transfer law corresponds to transformations to apply to the shape of the surface of the lens element for compensating the surface defects introduced by the selected manufacturing method. Thus, the shape of the surface of the lens element associated with the targeted optical function, is obtained by the selected manufacturing method.

Figure 3:
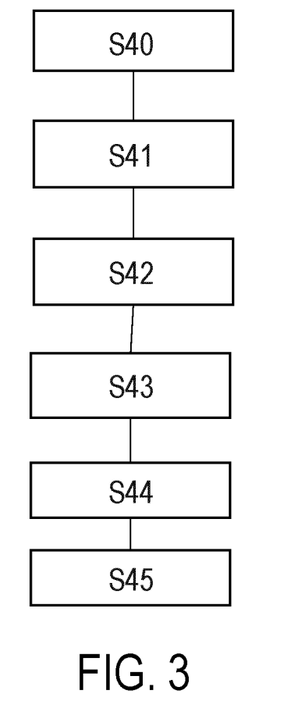

Alternatively or in combination with the precedent method for determining a transfer law, as represented on FIG. 3, the method implemented by computer means for determining a transfer law associated with a selected manufacturing method comprises at least:
- providing S40 a lens element which has been manufactured with the selected manufacturing method, the lens element comprising:
  - a refraction area having a first curvature and
  - a plurality of optical elements placed on at least part of the finished optical surface, each optical element having at least a second curvature;
- providing S41 lens data, the lens data indicating at least a shape of said surface of the lens element to obtain, said surface of the lens element comprising a surface of the refraction area and a surface of the optical elements placed on the refraction area, the shape of said surface of the lens elements being associated with a targeted optical function;

measuring S42 at least one optical characteristic of at least a zone of the lens element;

determining S43 at least one optical characteristic error based on a comparison of the measured at least one optical characteristic and the targeted optical function;

compiling information S44 corresponding to the determined optical characteristic error into database as correction information;

determining S45 a transfer law associated with the selected manufacturing method used to manufacture the lens element based on the correction information of the database, the transfer law correcting an original shape of the surface of the lens element comprising the at least one optical element so that once manufactured by the selected manufacturing method, the lens element reaches the targeted optical function.

Thus, With appropriate measurement means, it is possible to understand how the step of the selected manufacturing is changing the targeted optical function or in other words the targeted surface of the lens element.

For example, the polishing step may change the targeted optical function or in other words the targeted surface of the lens element. And then, one can deduct how to tune the design of the piece to be surface in order to, once it will be polished; get the right optical design for the system.

For example, what has been observed is that material removal from polishing may be higher at the top of the optical elements.

Figure 4A:
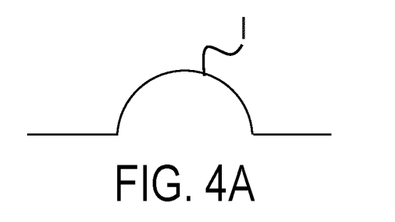
FIGS. 4A, 4B, 4C and 4D illustrate a method for determining surfacing data according to an embodiment of the present disclosure.
Figure 4B:
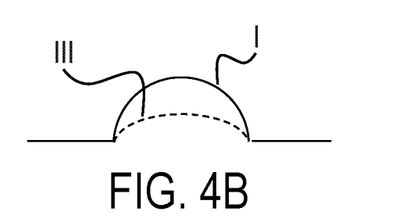
Figure 4C:
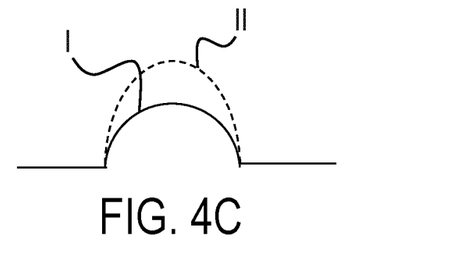
Figure 4D:
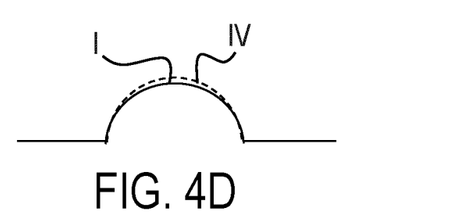
Figure 5A:
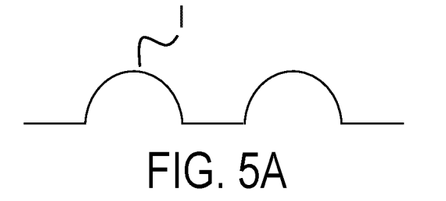
FIGS. 5A, 5B, 5C and 5D illustrate a method for determining surfacing data according to an embodiment of the present disclosure.
Figure 5B:
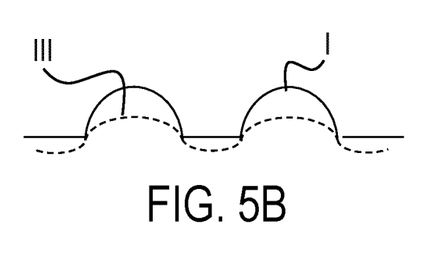
Figure 5C:
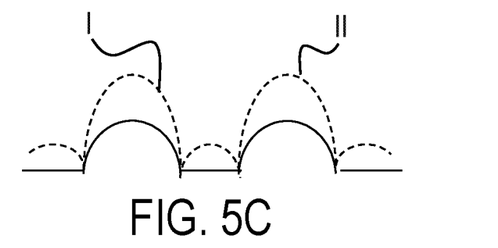
Figure 5D:
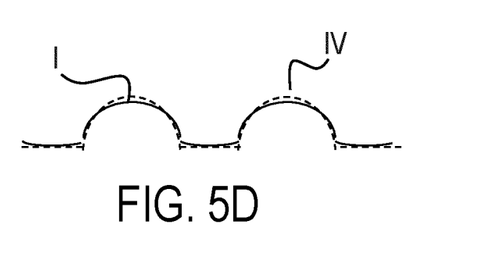
Figure 6A:
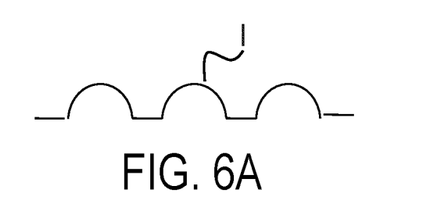
FIGS. 6A, 6B, 6C and 6D illustrate a method for determining surfacing data according to an embodiment of the present disclosure, FIG. 7 illustrate a predictive model according to an embodiment of the present disclosure.
Figure 6B:
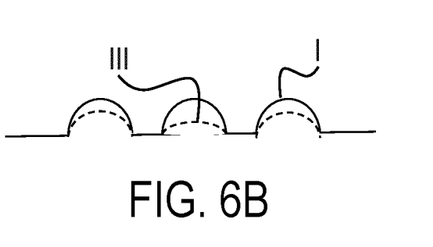
Figure 6C:
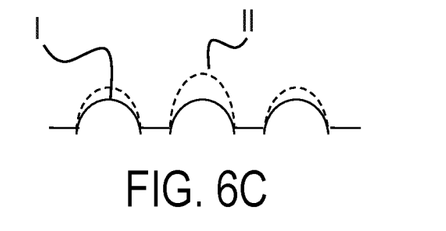
Figure 6D:
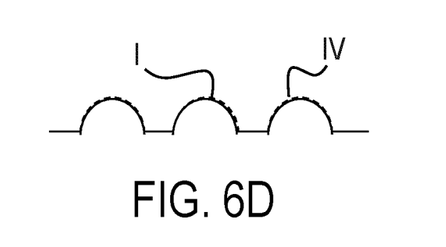

FIGS. 4A, 4B, 4C, 4D illustrates this example. FIG. 4A represents a diagram of the shape of a part of the surface of a lens element to obtain. The selected manufacturing method of the lens element of the FIG. 4A comprises at least a step of polishing. The shape is associated with a targeted optical function. The diagram is a cross section I of a part of the surface of a lens element to obtain. The cross section I comprises a flat part representing the refractive area and a circular part representing one optical element. FIG. 4B represents a diagram III of the shape of the part of the surface of the manufactured lens element after polishing and represents the diagram I of the shape of the part of the surface of the lens element to obtain. The difference between diagram I and III is measured defects which have been introduced by the selected manufacturing method. FIG. 4C represents a diagram II which represents the surface on which the transfer is applied for compensating the surface defects introduced by the selected manufacturing method. FIG. 4D represents a diagram IV which represents the manufactured surface obtained with the surfacing data based on the lens data and the transfer law.

Another example, what has been observed may be that material removal from polishing may be lower between microlenses. This example is illustrated in FIGS. 5A, 5B, 5C, 5D by analog means to FIGS. 4A, 4B, 4C, 4D.

Another example, what has been observed may be that material removal from polishing may be higher in the center of the lens element, thus the height of the optical elements is slowing down quicker in the center during the polishing step. This example is illustrated in FIGS. 6A, 6B, 6C, 6D by analog means to FIGS. 4A, 4B, 4C, 4D. For example, what has been observed is that material removal from spherical surfacing may be not deforming in the same manner in both radial and ortho radial direction. Consequently, thanks to the transfer law, the surface defects may be compensated.

For example, what has been observed is that asphericity due to the polishing (starting from identical spherical optical elements over the refractive area) may be not the same at the center or at the edge of the lens element. Consequently, thanks to the transfer law, the surface defects may be compensated.

For example, what has been observed is that asphericity due to the polishing (starting from identical spherical optical elements over the refractive area) may be not the same at the center or at the edge of the lens element. Consequently, thanks to the transfer law, the surface defects may be compensated.

Figure 7:
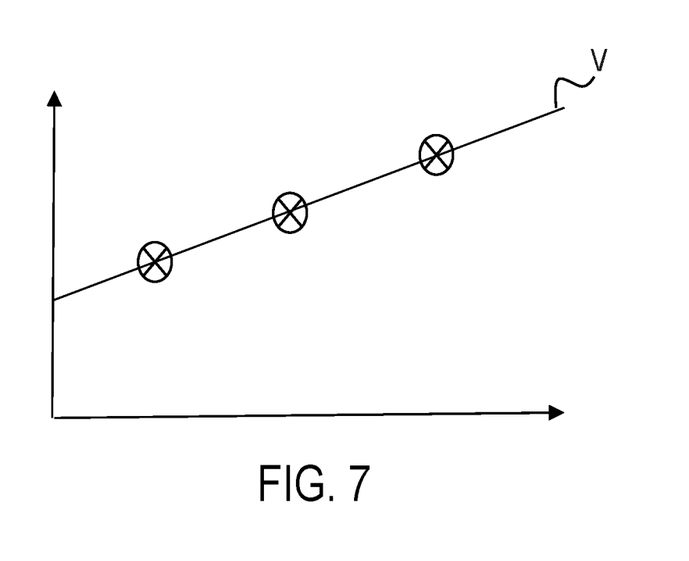

An example of transfer law with a predictive model is illustrated in FIG. 7. The graph on FIG. 7 shows the compensations applied as function to the optical function of an optical element. As shown, in this example, the transfer law is linear and more the power of the optical function increased, more the compensation is important. This transfer law was obtained by measuring the impact of polishing on the optical element with different optical functions, each optical function being associated with an optical power.

The disclosure has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A method implemented by a computer to determine surfacing data to obtain a surface of a lens element, the surface of the lens element including a refraction area having a first curvature, and a plurality of optical elements disposed on at least part of the finished optical surface, each of the optical elements having at least a second curvature, the method comprising:

providing lens data indicating at least a shape of said surface of the lens element to obtain, said surface of the lens element comprising a surface of the refraction area and a surface of the optical elements disposed on the refraction area, the shape of said surface of the lens element being associated with a targeted optical function;

selecting a manufacturing method intended to be implemented to obtain said surface of the lens element, said selected manufacturing method comprising a surfacing process and introducing surface defects on said surface of the lens element that are reproducible and specific to the manufacturing method in a repeatable manner, the surface defects modificating the targeted optical function;

providing a transfer law associated with the selected manufacturing method, the transfer law corresponding to transformations to apply to the shape of the surface of the lens element to compensate the surface defects introduced by the selected manufacturing method such that the targeted optical function is obtained by the selected manufacturing method; and determining the surfacing data to obtain the surface of the lens element associated with the targeted optical function, the determining the surfacing data being based on the lens data and the transfer law.

2. The method according to the claim 1,
wherein the providing the transfer law comprises providing a surfacing transfer law associated with the surfacing process, the surfacing transfer law corresponding to transformations to apply to the shape of the surface of the lens element to compensate the surfacing surface defects introduced by the surfacing process such that the targeted optical function is obtained by the selected manufacturing method, and
wherein the determining the surfacing data to obtain the surface of the lens element associated with the targeted optical function is based on the lens data and at least the surfacing transfer law.

3. The method according to the claim 1,
wherein the selected manufacturing method comprises a polishing process introducing polishing surface defects,
wherein the providing the transfer law comprises providing a polishing transfer law associated with the polishing process, the polishing transfer law corresponding to transformations to apply to the shape of the surface of the lens element to compensate the polishing surface defects introduced by the polishing process such that the targeted optical function is obtained by the selected manufacturing method, and
wherein the determining the surfacing data to obtain the surface of the lens element associated with the targeted optical function is based on the lens data and at least the polishing transfer law.

4. The method according to claim 3, wherein the polishing transfer law depends on one or more of: (i) the shape of the surface of the refractive area (ii) the shape of the surface of the optical elements, (iii) the material of the lens element, and (iv) a polishing condition.

5. The method according to claim 1, wherein the selected manufacturing method comprises a coating process introducing coating surface defects,
wherein the providing the transfer law comprises providing a coating transfer law associated with the coating process, the coating transfer law corresponding to transformations to apply to the shape of the surface of the lens element to compensate the coating surface defects introduced by the coating process such that the targeted optical function is obtained by the selected manufacturing method, and
wherein the determining the surfacing data to obtain the surface of the lens element associated with the targeted optical function is based on the lens data and at least the coating transfer law.

6. The method according to claim 1, wherein the transformations are related to one or more of:
a local power of the lens element,
an optical function associated to one or more of: the refractive area and the optical elements,
an asphericity of one or more of the refractive area and the optical elements,
a mean power of the lens element,
one or more of a surface of the refractive area and surfaces of the optical elements, and
a transition zone between the optical elements and the refractive area.

7. The method according to claim 1, wherein the targeted optical function is adapted to: one of: (i) at least one of slow down, retard, and prevent a progress of the eye of the person, (ii) correct an abnormal refraction of the eye of the person for at least one distance of view, and (iii) identify a lens element.

8. A method for manufacturing a lens element, the method comprising:
determining the surfacing data to obtain the lens element with the method implemented by the computer means according to claim 1; and
manufacturing the lens element by using the determined surfacing data with the selected manufacturing method.

9. The method according to the claim 2,
wherein the selected manufacturing method comprises a polishing process introducing polishing surface defects,
wherein the providing the transfer law comprises providing a polishing transfer law associated with the polishing process, the polishing transfer law corresponding to transformations to apply to the shape of the surface of the lens element to compensate the polishing surface defects introduced by the polishing process such that the targeted optical function is obtained by the selected manufacturing method, and
wherein the determining the surfacing data to obtain the surface of the lens element associated with the targeted optical function is based on the lens data and at least the polishing transfer law.

10. The method according to claim 2,
wherein the selected manufacturing method comprises a coating process introducing coating surface defects,
wherein the providing the transfer law comprises providing a coating transfer law associated with the coating process, the coating transfer law corresponding to transformations to apply to the shape of the surface of the lens element to compensate the coating surface defects introduced by the coating process such that the targeted optical function is obtained by the selected manufacturing method, and
wherein the determining the surfacing data to obtain the surface of the lens element associated with the targeted optical function is based on the lens data and at least the coating transfer law.

11. The method according to claim 3,
wherein the selected manufacturing method comprises a coating process introducing coating surface defects,
wherein the providing the transfer law comprises providing a coating transfer law associated with the coating process, the coating transfer law corresponding to transformations to apply to the shape of the surface of the lens element to compensate the coating surface defects introduced by the coating process such that the targeted optical function is obtained by the selected manufacturing method, and
wherein the determining the surfacing data to obtain the surface of the lens element associated with the targeted optical function is based on the lens data and at least the coating transfer law.

12. The method according to claim 4,
wherein the selected manufacturing method comprises a coating process introducing coating surface defects,
wherein the providing the transfer law comprises providing a coating transfer law associated with the coating process, the coating transfer law corresponding to transformations to apply to the shape of the surface of the lens element to compensate the coating surface defects introduced by the coating process such that the targeted optical function is obtained by the selected manufacturing method, and wherein the determining the surfacing data to obtain the surface of the lens element associated with the targeted optical function is based on the lens data and at least the coating transfer law.

13. The method according to claim 2, wherein the transformations are related to one or more of:
   a local power of the lens element, an optical function associated to one or more of: the refractive area and the optical elements,
   an asphericity of one or more of the refractive area and the optical elements,
   a mean power of the lens element,
   one or more of a surface of the refractive area and surfaces of the optical elements, and
   a transition zone between the optical elements and the refractive area.

14. A method for determining a transfer law associated with a selected manufacturing method of a lens element, the lens element including a refraction area having a first curvature, and a plurality of optical elements disposed on at least part of the finished optical surface, each of the optical elements having at least a second curvature, the method comprising:
   providing lens data indicating at least a shape of said surface of the lens element to obtain, said surface of the lens element comprising a surface of the refraction area and a surface of the optical elements placed on the refraction area, the shape of said surface of the lens element being associated with a targeted optical function;
   selecting a manufacturing method intended to be implemented to obtain a surface of the lens element, said manufacturing method comprising surfacing and introducing surface defects on the surface of the lens element that are reproducible and specific to the manufacturing method in a repeatable manner;
   selecting a predictive model of said surface defects;
   determining, by said predictive model, surface defect data associated to the surface defects introduced by the selected manufacturing method; and
   determining the transfer law corresponding to transformations to apply to the shape of the surface of the lens element to compensate the surface defects introduced by the selected manufacturing method such that the targeted optical function is obtained by the selected manufacturing method.

15. A method for determining a transfer law associated with a selected manufacturing method of a lens element, the method comprising:
   providing a lens element which has been manufactured with the selected manufacturing method, the lens element comprising:
      a refraction area having a first curvature, and
      a plurality of optical elements disposed on at least part of the finished optical surface, each of the optical elements having at least a second curvature;
   providing lens data indicating at least a shape of said surface of the lens element to obtain, said surface of the lens element comprising a surface of the refraction area and a surface of the optical elements placed on the refraction area, the shape of said surface of the lens element being associated with a targeted optical function;
   measuring at least one optical characteristic of at least a zone of the lens element;
   determining at least one optical characteristic error based on a comparison of the measured at least one optical characteristic and the targeted optical function;
   compiling information corresponding to the determined optical characteristic error into a database as correction information; and
   determining the transfer law associated with the selected manufacturing method used to manufacture the lens element based on the correction information of the database, the transfer law corresponding to transformations to apply to correct an original shape of the surface of the lens element comprising the at least one optical element to compensate for the surface defects introduced by the selected manufacturing method so that once manufactured by the selected manufacturing method, the lens element reaches the targeted optical function, the surface defects being reproducible and specific to the selected manufacturing method in a repeatable manner.

16. A non-transitory computer-readable medium on which is stored a series of instructions, which, when loaded in a computer, results in the execution by said computer of a method for determining surfacing data to obtain a lens element, the lens element including a refraction area having a first curvature, and a plurality of optical elements disposed on at least part of the finished optical surface, each of the optical elements having at least a second curvature, the method comprising:
   providing lens data indicating at least a shape of said surface of the lens element to obtain, said surface of the lens element comprising a surface of the refraction area and a surface of the optical elements placed on the refraction area, the shape of said surface of the lens element being associated with a targeted optical function;
   selecting a manufacturing method intended to be implemented to obtain said surface of the lens element, said selected manufacturing method introducing surface defects on said surface of the lens element that are reproducible and specific to the manufacturing method in a repeatable manner, the surface defects modificating the targeted optical function;
   providing a transfer law associated with the selected manufacturing method, the transfer law corresponding to transformations to apply to the shape of the surface of the lens element to compensate the surface defects introduced by the selected manufacturing method such that the targeted optical function is obtained by the selected manufacturing method; and
   determining the surfacing data to obtain the surface of the lens element associated with the targeted optical function, the determining the surfacing data being based on the lens data and the transfer law.

17. The non-transitory computer-readable medium of claim 16,
   wherein the selected manufacturing method comprises a polishing process introducing polishing surface defects,
   wherein the providing the transfer law comprises providing a polishing transfer law associated with the polishing process, the polishing transfer law corresponding to transformations to apply to the shape of the surface of the lens element to compensate the polishing surface defects introduced by the polishing process such that the targeted optical function is obtained by the selected manufacturing method, and wherein the determining the surfacing data to obtain the surface of the lens element associated with the targeted optical function is based on the lens data and the transfer law comprising at least the polishing transfer law.

18. A method implemented by a computer to determine surfacing data to obtain a surface of a mold of a lens element, the lens element including a refraction area having a first curvature, and a plurality of optical elements disposed on at least part of the finished optical surface, each of the optical elements having at least a second curvature, the method comprising:

providing lens data indicating at least a shape of said surface of the mold of the lens element to obtain, the surface of the lens element comprising a surface of the refraction area and a surface of the optical elements placed on the refraction area, the shape of the surface of the lens element being associated with a targeted optical function;

selecting a manufacturing method intended to be implemented to obtain said surface of a mold of the lens element, said selected manufacturing method introducing surface defects on said surface of the mold of the lens element that are reproducible and specific to the manufacturing method in a repeatable manner, the surface defects modificating the targeted optical function;

providing a surfacing transfer law associated with the selected manufacturing method, the surfacing transfer law corresponding to transformations to apply to the shape of the mold of the surface of the lens element to compensate the surface defects introduced by the selected manufacturing method such that the targeted optical function is obtained by the selected manufacturing method; and determining the surfacing data to obtain the surface of the mold of the lens element associated with the targeted optical function, the determining the surfacing data being based on the lens data and the surfacing transfer law.

19. A lens element intended to correct an abnormal refraction of an eye of a person, the lens element comprising:

a refractive area having a first surface optical power; and a plurality of optical elements disposed on at least one surface of the holder, the plurality of optical elements having a second surface optical power and each optical element having a maximum sag, wherein the holder and the plurality of optical elements are intended to be polished, the maximum sag of the plurality of the optical elements is at least 10% higher than the maximum sag of the plurality of the optical elements after polishing.

* * * * *